(12) United States Patent
Fischer

(10) Patent No.: US 6,601,871 B2
(45) Date of Patent: Aug. 5, 2003

(54) SIDE GAS BAG MODULE

(75) Inventor: Anton Fischer, Leinweiler (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/965,286

(22) Filed: Sep. 27, 2001

(65) Prior Publication Data

US 2002/0036396 A1 Mar. 28, 2002

(30) Foreign Application Priority Data

Sep. 27, 2000 (DE) .......................... 200 16 717

(51) Int. Cl.[7] .......................... B60R 21/22; B60R 21/26
(52) U.S. Cl. .................... 280/730.2; 280/736; 280/742
(58) Field of Search .................... 280/730.2, 736, 280/741, 742, 730.1

(56) References Cited

U.S. PATENT DOCUMENTS

| 5,588,672 A | * | 12/1996 | Karlow et al. | ............ 280/730.1 |
| 5,899,486 A | * | 5/1999 | Ibe | ........................... 280/728.2 |
| 6,099,029 A | * | 8/2000 | H.ang.land et al. | ......... 280/729 |
| 6,276,712 B1 | * | 8/2001 | Welch et al. | ............ 280/730.2 |
| 6,293,581 B1 | * | 9/2001 | Saita et al. | ............ 280/730.2 |
| 6,450,527 B2 | * | 9/2002 | Kobayashi et al. | ......... 280/729 |

FOREIGN PATENT DOCUMENTS

| DE | 19542436 A1 | 5/1997 |
| DE | 19738741 A1 | 3/1999 |
| DE | 19848794 A1 | 5/1999 |
| DE | 29905770 U1 | 1/2000 |
| DE | 29921743 U1 | 5/2000 |
| DE | 19856623 A1 | 6/2000 |
| EP | 0694444 B1 | 1/1996 |
| GB | 233075 A | 7/1999 |
| JP | 11-240407 A | * 9/1999 |

OTHER PUBLICATIONS

U.S. Mueller patent application Publication No. US 2001/0045729 A1, Publication Date Nov. 29, 2001 entitled Air Bag Device, Production Method of an Air Bag Device, Activation Method of an Air Bag Device Vehicle with an Air Bag Device.

Pending U.S. Brucker et al. patent application Ser. No. 09/536,901, filed Mar. 28, 2000 entitled an Inflatable Protective Cushion for Side Impact Protection.

U.S. Fischer patent application Ser. No. 09/732,228, filed Dec. 7, 2000 entitled Vehicle Occupant Restraint System, Attorney Docket No. TRW(REPA)5637.

* cited by examiner

Primary Examiner—Paul N. Dickson
Assistant Examiner—Ruth Ilan
(74) Attorney, Agent, or Firm—Tarolli, Sundheim, Covell & Tummino L.L.P.

(57) ABSTRACT

The invention relates to a side gas bag module comprising a gas generator, a gas bag having an elongated shape in its folded condition for covering at least one side window of a motor vehicle and a protective sleeve having longitudinal ends which sleeve surrounds the gas bag in its folded condition. The gas bag has at least one restraint chamber and at least two fittings. The gas generator has at least two gas conduits which are connected with the fittings. The fittings project out from the protective sleeve between the longitudinal ends of the protective sleeve.

7 Claims, 1 Drawing Sheet

SIDE GAS BAG MODULE

This invention relates to a side gas bag module.

BACKGROUND OF THE INVENTION

Side gas bags, so-called window bags, are often folded to form an elongated package and are arranged along a roof contour of a vehicle. A gas generator, which in the case of restraint supplies gas for inflating the gas bag, may be disposed at the front or rear end of the package. This technique is employed above all for gas bags which extend approximately from the A-column to the C-column of the vehicle and cover more or less the entire region of the side windows. Such gas bags either have one large restraint chamber or a plurality of restraint chambers disposed one beside the other.

The gas must cover large distances from the gas generator, in order to reach the end of the gas bag remote from the gas generator. To reduce the inflation time of the gas bag and to protect the gas bag fabric against high loads resulting from the hot, highly pressurized gas, gas lances made of metal are used, which extend through the gas bag and fill the remote end of the gas bag or a further restraint chamber. This gas lance must be introduced into the gas bag before the same is folded, which renders manufacture more expensive.

It is also known to dispose a gas generator in the middle of a gas bag module with a gas bag folded to form a tube. The gas generator has gas conduits, which are each connected with individual restraint chambers of the gas bag. Since the gas generator lies inside the tubular gas bag package, the gas generator must be incorporated before folding the gas bag, which makes folding the gas bag a complex process.

BRIEF SUMMARY OF THE INVENTION

It is the object of the invention to provide an inexpensive gas bag module.

This is achieved in a side gas bag module which comprises a gas generator, a gas bag having an elongated shape in its folded condition for covering at least one side window of a motor vehicle and a protective sleeve having longitudinal ends which sleeve surrounds the gas bag in its folded condition. The gas bag has at least one restraint chamber and at least two fittings. The gas generator has at least two gas conduits which are connected with the fittings. The fittings project out from the protective sleeve between the longitudinal ends of the protective sleeve i.e. through the outer shell. The gas bag can be folded without inserting a gas generator or a gas lance. After having been folded, the gas bag is packed into a protective sleeve, so that a tubular package is obtained. The fittings of the gas bag project from the protective sleeve not at the longitudinal ends of gas bag and protective sleeve, but between the longitudinal ends. Via the fittings and the gas conduits, the gas bag is connected with the gas generator, so that the gas generator need not inflate the gas bag from a longitudinal end. Favorably, the fittings are disposed close to each other and are rather short. Via the fittings, various portions of the gas bag are quickly inflated. The term fitting is to be understood as a connection between two parts.

Preferably, slots are provided in the protective sleeve. The fittings of the gas bag project through these slots, in order to be connected with the gas conduits. The slots form openings which are so small that the gas bag nevertheless is protected against being soiled and damaged.

In the folded condition, the gas bag preferably forms a tubular gas bag package, and the fittings and the gas generator are disposed close to the middle of the package as seen transverse to the longitudinal direction. In this way, a gas generator can preferably be mounted above or below the folded gas bag, e.g. in the region of the B-column of the vehicle. The distances to be covered by the gas for filling the gas bag are short, and the inflation time is reduced.

The fittings preferably open into different restraint chambers of the gas bag. Since each connection is associated to a gas conduit of the gas generator, a division of the gas flows into the restraint chambers can be achieved, so that chambers of different sizes can specifically be filled. Moreover, dividing the gas stream among two fittings reduces the load acting on the gas bag fabric. A gas lance can be omitted.

To ensure a uniform distribution of the gas among the fittings, the gas generator may have a compensating chamber which is connected with the gas conduits. In this case, the gas flows from the gas generator first of all into the compensating chamber and from there into the gas conduits, whereby it is ensured that the same pressure exists upstream of both gas conduits.

It is another object of the invention to fill a gas bag in a rapid, simple and inexpensive way.

In a gas bag module as mentioned above this is achieved in that both fittings open into the same restraint chamber. By the division among two fittings, a large gas volume can quickly be introduced into the chamber, without the gas bag fabric surrounding the inlet opening being strained too much.

Another advantage consists in that the gas stream can specifically be directed into the chamber by choosing the angle at which the fittings open into the gas bag. It is particularly favorable when the fittings open into the restraint chamber at an obtuse angle. This can effect a rapid deployment of the gas bag, as the gas stream impinges on the folded gas bag on a wide surface area.

Preferably, the gas generator and the fittings are disposed centrally with respect to the folded gas bag, so that a gas lance can be omitted.

Preferably, the gas generator has a compensating chamber which is connected with the gas conduits in order to ensure that the gas pressure is the same in both fittings.

DETAILED DESCRIPTION OF THE PREFERRED EMBODIMENTS

Figure 1:
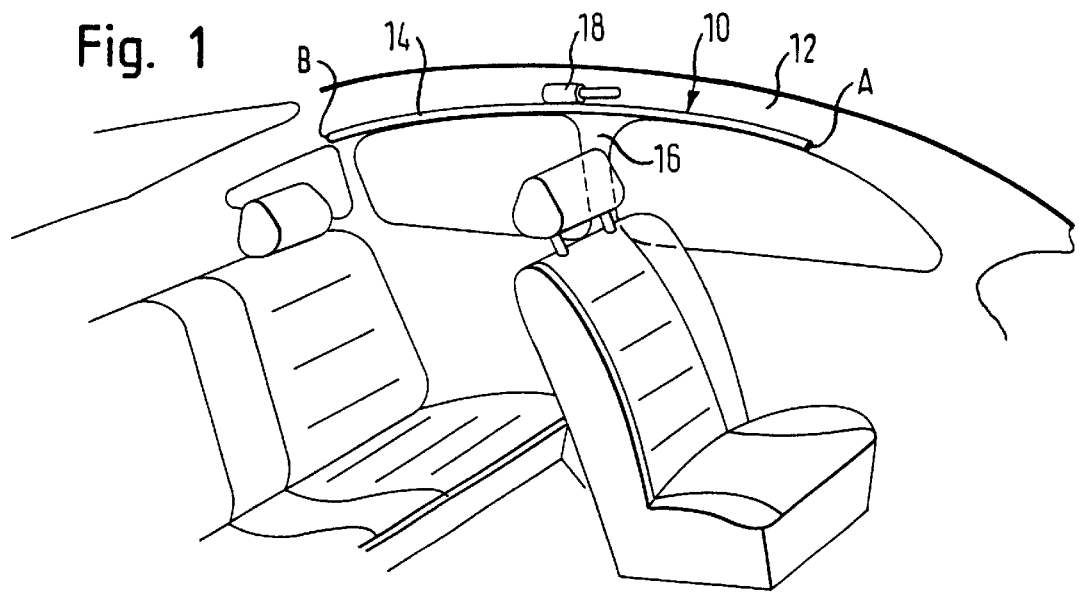
FIG. 1 shows a side gas bag module of the invention in the folded condition of the gas bag.

FIG. 1 shows a side gas bag module 10 of the invention in the folded condition of the gas bag, arranged along a roof contour 12 of a vehicle. The gas bag is folded into a tubular package 14 (shown in section in FIG. 2), which has two longitudinal ends A, B. In the region of the B-column 16, approximately at half the longitudinal extension of the gas bag package 14, a gas generator 18 is attached. The gas generator 18 is mounted directly above the gas bag package 14 and in the case of an accident serves to fill the gas bag with compressed gas. The gas generator 18 may be a pyrotechnical gas generator or some other compressed gas source.

Figure 2:
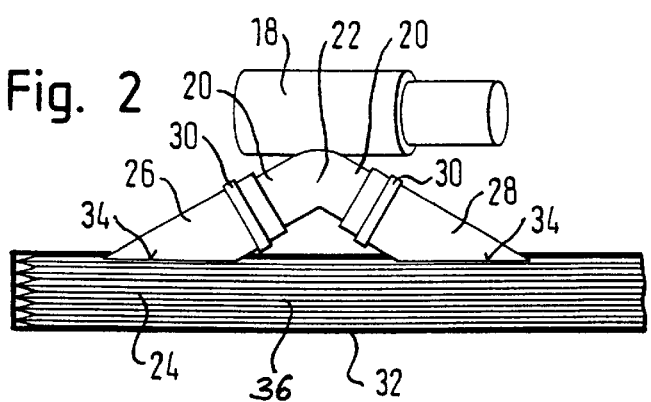
FIG. 2 shows a partial view of a side gas bag module of the invention.

As can be seen in FIG. 2, the gas generator 18 has two short, pipe-shaped gas conduits 20. The gas conduits 20 may be connected with the gas generator 18 via a compensating chamber 22 and project from the housing of the gas generator 18 at an obtuse angle.

The gas bag 24 has two short fittings 26 and 28 in the form of projections of the fabric gas bag wall shown, which projections have a tubular shape and project from the upper edge of the gas bag at an obtuse angle. The fittings 26, 28 are disposed at a short distance one beside the other approximately in the middle of the gas bag as seen in the longitudinal direction of the gas bag. The fittings 26, 28 are connected with the gas conduits 20, e.g. via hose clamps 30.

The folded gas bag 24 is completely surrounded by a protective sleeve 32, which may for instance consist of a stable plastic film and protects the gas bag against being soiled and damaged. The protective sleeve likewise has longitudinal ends at the points A and B. In the protective sleeve 32 slots 34 are provided, through which the fittings 26, 28 project from the protective sleeve 32.

During the assembly of the gas bag module 10 the gas bag 24 is folded and drawn into the protective sleeve 32. Subsequently, the protective sleeve 32 is provided with the slots 34. The fittings 26, 28 are drawn through the slots 34 and connected with the gas conduits 20 of the gas generator 18 in a gas-tight way by means of the hose clamps 30. Finally, the gas bag module 10 is mounted in the region of the vehicle roof.

Figure 3A:
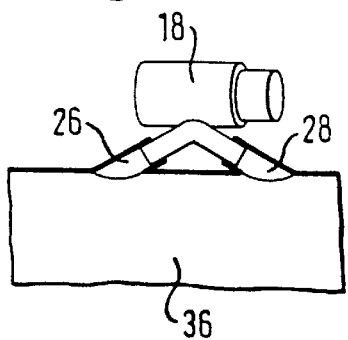
FIG. 3a shows a partial view of a side gas bag module of the invention in accordance with a first embodiment.

In accordance with an embodiment represented in FIG. 3a, the gas bag 24 has a large restraint chamber 36, into which open both fittings 26, 28.

Figure 3B:
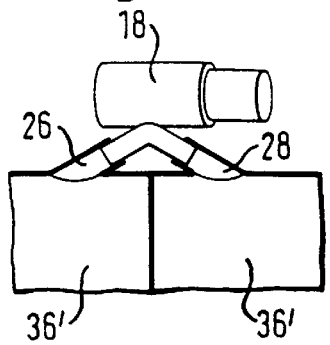
FIG. 3b shows a partial view of a gas bag module of the invention in accordance with a second embodiment.

In the embodiment shown in FIG. 3b, the gas bag 24 has two restraint chambers 36' disposed one beside the other, and the fittings 26, 28 open into different restraint chambers.

The gas conduits 20 may but need not necessarily end outside the restraint chamber or chambers, but rather the gas conduits 20 may be extended by means of e.g. a tube, a hose or a fabric sleeve and, thus, reach into the restraint chamber or chambers, in order to direct the gas streams more specifically. The extensions may have an outflow opening at the end on the side of the gas bag and/or openings distributed across the length.

What is claimed is:

1. A side gas bag module comprising:

an elongated gas generator, a gas bag having an elongated shape in its folded condition for covering at least one side window of a motor vehicle, and a protective sleeve having longitudinal ends which sleeve surrounds said gas bag in its folded condition, said gas bag having at least one restraint chamber and at least two fittings, said gas generator having at least two gas conduits which radially protrude together from the same side of said gas generator and diverge towards their free ends and are connected with said fittings, said fittings projecting out from said protective sleeve at locations between said longitudinal ends of said protective sleeve and open into said at least one chamber at an obtuse angle with respect to each other, said at least two conduits defining radially enclosed elongate passages for transporting gas emerging from said gas generator upon inflation of said gas bag.

2. The gas bag module as claimed in claim 1, wherein in said folded condition said gas bag forms an elongated package, and wherein said fittings and said gas generator are disposed close to a middle of said package as seen transverse to a longitudinal direction.

3. The gas bag module as claimed in claim 1, wherein said gas generator is disposed above or below said gas bag in said folded condition thereof when mounted to said vehicle.

4. The gas bag module as claimed in claim 1, wherein at least one slot is provided in said protective sleeve, said fittings extending through said at least one slot.

5. The gas bag module as claimed in claim 1, wherein said gas generator has a compensating chamber which is connected with said gas conduits, said compensating chamber being for equalizing gas pressure emerging from said gas generator upon inflation of said gas bag before gas is directed through said two diverging conduits.

6. The gas bag module as claimed in claim 1, wherein both fittings open into the same restraint chamber.

7. The gas bag module as claimed in claim 1, wherein said gas bag has a gas bag wall which has projections that form said fittings.

* * * * *